United States Patent [19]

Schirmer et al.

[11] Patent Number: 4,701,596

[45] Date of Patent: Oct. 20, 1987

[54] DEVICE FOR SUPERVISING CONDITION OF ELECTRIC CONSUMERS IN A MOTOR VEHICLE

[75] Inventors: Guenter Schirmer, Ingersheim; Gerhard Woelffing-Seelig, Stuttgart, both of Fed. Rep. of Germany

[73] Assignee: Robert Bosch GmbH, Stuttgart, Fed. Rep. of Germany

[21] Appl. No.: 817,044

[22] Filed: Jan. 8, 1986

[30] Foreign Application Priority Data

Jan. 11, 1985 [DE] Fed. Rep. of Germany ....... 3500676

[51] Int. Cl.⁴ .............................................. H05B 1/02
[52] U.S. Cl. .................................. 219/483; 219/205; 219/497; 219/506; 123/179 BG; 123/179 H
[58] Field of Search ................................ 219/201–205, 219/210, 494, 450, 497, 501, 506; 324/397, 399; 123/179 B, 179 BG, 179 H

[56] References Cited

U.S. PATENT DOCUMENTS

| | | | |
|---|---|---|---|
| 3,543,572 | 12/1970 | Summerer et al. | 324/397 |
| 3,743,922 | 7/1973 | Festos | 324/399 |
| 4,090,125 | 5/1978 | Warner | 324/399 |
| 4,547,734 | 10/1985 | Spaude | 324/399 |

FOREIGN PATENT DOCUMENTS 2934071  3/1981  Fed. Rep. of Germany .

*Primary Examiner*—M. H. Paschall
*Attorney, Agent, or Firm*—Michael J. Striker

[57] ABSTRACT

A device for monitoring operational condition of electrical consumers in a motor vehicle, particularly of heater plugs of a diesel engine, includes inductances connected in series between respective heater plugs and their d.c. supply. Alternating or pulsating current is supplied to a connection point of the inductances with the d.c. supply, and potentials across the inductances and the heater plugs are simultaneously evaluated to indicate a defective heater plug.

6 Claims, 1 Drawing Figure

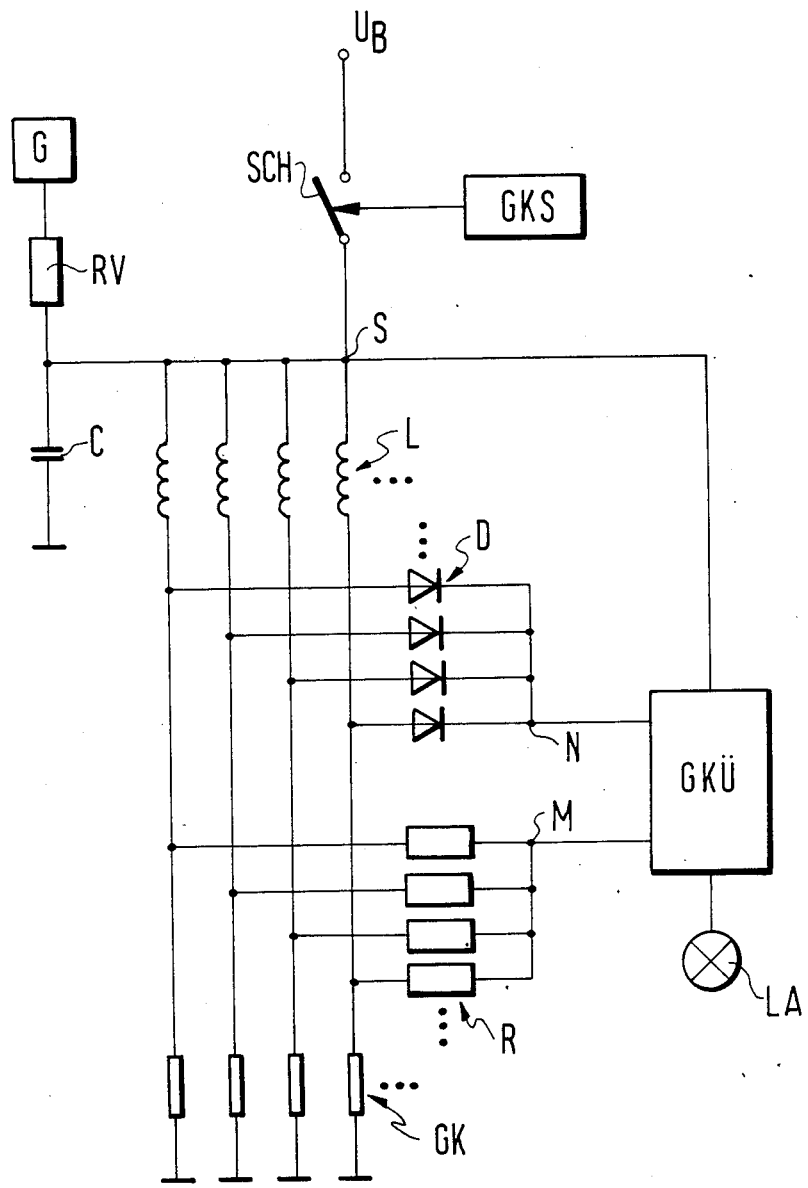

DEVICE FOR SUPERVISING CONDITION OF ELECTRIC CONSUMERS IN A MOTOR VEHICLE

BACKGROUND OF THE INVENTION

The present invention relates to a device for supervising at least two direct current electric consumers in a motor vehicle including a switching device for controlling the flow of direct current through the consumers.

From the German Patent Application P 29 34 071.4 a device is known in which power supply to each electrical consumer is performed via a separate electromagnetic transformer. In this manner it is made possible to test whether electric current does flow thorugh individual consumers or not. The disadvantage of this prior art device is the necessity to employ a separate electromagnetic transformer for each consumer and consequently high requirements for material and for installation cost.

SUMMARY OF THE INVENTION

It is therefore a general object of this invention to avoid the disadvantages of prior art devices of this kind.

In particular, it is an object of this invention to provide a supervising device which is simpler in construction and enables a less expensive test of the current flow.

In keeping with these objects and others which will become apparent hereafter, one feature of this invention resides in a dynamic decoupling of respective consumers, for example heater plugs, one from the other by means of impedances. The dynamic decoupling is effected in such a manner that an inductance is connected in series with each consumer (heater plug) whereby a single control device controls the flow of direct current through each consumer. It is of particular advantage when in the case of a plurality of parallel connected series connections of a consumer with an inductive coil a capacitor is connected parallel to the series connections to produce a tank circuit. An alternating current generator or a pulse generator is connected to the tank circuit to apply AC voltage thereto. The testing of the flow of current through individual consumers (heater plugs) is performed by comparing direct current and alternating current potentials at connection points between respective consumers and the corresponding inductive coils.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates a circuit diagram of an embodiment of the supervising device of this invention.

DESCRIPTION OF THE PREFERRED EMBODIMENT

The supervising or monitoring device of this invention can in principle be employed in connection with all electric consumers in a motor vehicle. The invention is particularly advantageous for controlling the condition of heater plugs used in diesel engines.

In the FIGURE, reference characters GK indicate a set of heater plugs in a diesel engine, whose number normally corresponds to the number of engine cylinders. According to the invention, each heater plug is connected in series with an induction coil L and a diode D, and a resistor R is connected to each connection point between the heater plug GK and an induction coil L. All series connections of induction coils L and of heater plugs GK are connected in parallel to each other between ground and a nodal point S. The nodal point S is connected via a switch SCH to direct current or battery voltage $U_B$ whereby the switch SCH is switched on or off by a heater plug control GKS. The connection points between inductive coils L and heater plug GK as mentioned before are connected respectively via diodes D to a nodal point N, and via resistors R from a nodal point M. The nodal points N and M are connected to inputs of a heater plug monitoring device GKU power supplied from the nodal point S and having at its output an indicator LA controlled by input signals from respective points M and N to indicate a defective heater plug. The nodal point S is further connected via a series resistor RV which can be also in the form of an inductive or capacitive resistor, to an alternating signal generator V. The nodal point S is also connected to a capacitor C whose other terminal is grounded.

In closed condition of the switch SCH direct current from battery $U_B$ flows through respective inductive coils L and heater plugs GK to ground. In this static or direct current operational condition the supervising device GKU is inoperative inasmuch there is no measurable voltage drop across the coils L for the direct current and consequently without the decoupling effect of the coils there is always the full potential of battery voltage $U_B$ irrespective of the operative or defective condition of the heater plugs.

If, however, the switch SCH is open and the alternating current generator G is connected to the nodal point S, the indicator LA can monitor the operativeness of the set of heater plugs. Alternating current or pulses generated by generator G are applied through series resistor RV to the nodal point S and the induction coils L decouple the supply of the alternating current to individual heater plugs GK. Accordingly, by virtue of the inductance of the induction coils L, voltage drops are present across the induction coils which are different from the voltage of the generator G. If the heater plugs GK are intact, a relatively low voltage appears at respective connection points between the heater plugs and the corresponding inductive coils L inasmuch as the operative heater plugs have a relatively low resistance At the nodal point M a voltage V it generated which corresponds to a mean value of voltages at respective connection points between the heater plugs and the induction coils. At the same time, at the nodal point N a voltage is generated, which corresponds to a maximum voltage value at a connection point less the voltage drop across a diode D pertaining to this connection point. Consequently, in the case of intact heater plugs GK voltage appearing at nodal point N is less than voltage appearing at nodal point M. This voltage difference is recognized by the heater plug monitoring device GKU which can be in the form a comparator for example and the indicator lamp LA remains inactive. If, however, at least one of the heater plugs GK is interrupted then the resistance of the defective plug becomes infinite and a higher voltage appears at the corresponding connection point of the defective plug with the series connected inductive coil L. Due to the voltage increase at the particular connection point the mean voltage at the nodal point M changes to a higher value. At the same time, however, also the voltage at the nodal point N increases to a value corresponding to the high potential at the connection point between the defective heater plug and its induction coil less the forward voltage of the corresponding diode. Hence in this operational condition when at least one heater plug is interrupted, the comparison between voltages at nodal points N and M detects a higher voltage at the nodal point N than at the nodal point M. When the voltage at the input N of the supervising device GKU exceeds the voltage at the input M, then this condition is indicated by activating the indicator lamp LA.

The purpose of capacitor C is to form together with the parallel connected series connections of induction coils L and heater plug GK a parallel oscillating circuit which improves the sensitivity of the supervising device and contributes to a reliable detection of defective heater plugs by the monitoring circuit GKU. It is not necessary, however, that the capacity required for the creation of a tank circuit be in the form of a discrete capacitor inasmuch as due to distributed capacity of conductors especially of conductors leading to individual heater plugs with suitably dimensioned inductive coils may form a parallel oscillating circuit. In principle, the capacitor C can be dispensed with if the precondition for the operation of the device of this invention, namely the mutual decoupling of respective electric consumers by means of inductances L, is preserved. If desired, instead of wound inductive coils L which are rather expensive to manufacture, it suffices to sleeve simply ferrite tubes of a suitable ferrite material on respective power supply conductors leading to the heater plugs whereby the requisite inductance is obtained. Accordingly, in the preferred embodiment of this invention the simplest installation is achieved by using the above described ferrite tubes slid over the power supply conductors to heater plugs whereby the own capacity of the power supply conductor as utilized for the creation of a tank circuit.

The switching device SCH serving for switching on or off the direct current to the nodal point S, can be for example in the form of a conventional relay or in the form of an electronic switching device using transistors for example. In the latter case, it is possible to achieve a high switching frequency and in a further advantageous modification of this invention, the alternating current generator G with the series resistor RV can be dispensed with and the alternating or pulsating voltage necessary for the operation of the supervising device of this invention, can be supplied directly by the electronic switch SCH controlled as to the switching frequency by the control device GKS.

In the illustrated embodiment the diodes leading to the connection points of respective heater plugs are united at the point N which in turn is connected to an input of a single heater plug supervising device GKU. In another modification of this invention it has proved as advantageous when there are provided as many supervising devices GKU as many heater plugs are present in the engine whereby the diodes D are connected to an input of an assigned heater plug supervising device. The advantage of this modification is the capability of recognizing not only the malfunction of a heater plug in a set but also it is directly indicated which of the plugs is defective.

The resistors R together with the other nodal point M can be also eliminated and the voltage at the nodal point N in this case is compared with the potential at the nodal point S or with a potential derived in a voltage divider. In the latter case, the polarity of diodes D is reversed.

In the illustrated exemplary embodiment the heater plug supervising or monitoring device GKU is also connected to the nodal point S and consequently is also subject to the output voltage from the alternating current or pulse genertor G. As a consequence, in the preferred embodiment of this invention the output voltage of the generator is employed for triggering the supervising function, that means the comparison between the voltages at nodal points N and M. For example, the comparison between voltages at points N and M occurs in response to the generation of each voltage pulse at the output of the generator G whereby the supervising device GKU is equipped with a memory which stores the comparison results until the next voltage pulse at the generator output is produced. The same triggering function is also possible when the generator is eliminated and the alternating current is produced by oscillations of the switching device SCH.

The heater plug control GKS and the generator G can be realized in different forms. For example, it is possible to design the heater plug control GKS and the generator G in such a manner that they operate in response to predetermined operational variables of the engine. Also the indicator which in this example is in the form of an indicator lamp can be replaced by a different kind of indicating or warning device.

While the invention has been illustrated and described as embodied in a specific example for use in monitoring heater plugs of an engine, it is not intended to be limited to the details shown, since various modifications and structural changes can be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for monitoring condition of a plurality of direct current electric consumers in a motor vehicle including means for controlling the direct current supply to said consumers, said device comprising impedance means connected between said controlling means and respective consumers to electrically separate said consumers one from the other for alternating or pulsating current; means for feeding via said impedance means alternating or pulsating current to said consumers; means for evaluating alternating or pulsating current potentials across each of said impedance means and consumers; and means for indicating a change of said potentials due to an altered condition of at least one of said consumers; said impedance means including inductances connected in series with respective consumers; said evaluating means including a comparator for comparing said potentials at respective connection points between the series connected inductances and consumers, a plurality of diodes connected between an input of said comparator and said connection points, and a plurality of resistors connected between another input of said comparator and said connection points; and said indicating means including an indicator activated by a predetermined difference of potentials between said inputs.

2. A device for monitoring condition of a plurality of direct current electric consumers in a motor vehicle including means for controlling the direct current supply to said consumers, said device comprising impedance means connected between said controling means and respective consumers to electrically separate said consumers one from the other for alternating or pulsating current; means for feeding via said impedance means alternating or pulsating current to said consumers; means for evaluating alternating or pulsating current potentials across each of said impedance means and consumers; and means for indicating a change of said potentials due to an altered condition of at least one of said consumers; said impedance means including inductances connected in series with respective consumers; said evaluating means including a comparator for comparing said potentials at respective connection points between the series connected inductances and consumers, a plurality of diodes connected between an input of said comparator and said connection points, and a plurality of resistors connected between another input of said comparator and said connection points; said indicating means including an indicator activated by a predetermined difference of potentials between said inputs; and said impedance means further comprising a capacitance connected parallel to series connections of said inductances and said consumers to form a tank circuit.

3. A device for monitoring condition of a plurality of direct current electric consumers in a motor vehicle including means for controlling the direct current supply to said consumers, said device comprising a source of alternating or pulsating current; impedance means including a plurality of inductances connected in series between respective consumers and outputs of said controlling means and alternating/pulsating current source to electrically separate said consumers one from the other for alternating/pulsating current; means for comparing alternating/pulsating current potentials across respective inductances with a direct current potential across said consumers, said comparing means including rectifiers connected to connection points between said consumers and said inductances to generate a rectified alternating/pulsating current potential; and means for indicating a change between said rectified alternating-/pulsating current-and said direct current potentials due to an altered condition of at least one of said consumers.

4. A device as defined in claim 3, wherein said evaluating means includes a comparator for comparing said potentials at respective connection points between the series connected inductances and consumers.

5. A device as defined in claim 3, wherein said means for feeding alternating or pulsating current is a device for periodically switching the direct current supply to said consumers.

6. A device as defined in claim 3, wherein said means for feeding alternating or pulsating current includes a generator connected via a resistance to a connection point between said direct current controlling means and said inductances.

7. A device for monitoring condition of a plurality of direct current electric consumers in a motor vehicle including means for controlling the direct current supply to said consumers, comprising frequency dependent resistive means connected between said controlling means and respective consumers to electrically separate said consumers one from the other for alternating or pulsating current; means for feeding via said resistive means alternating or pulsating current to said consumers; means for evaluating alternating or pulsating current potentials across each of said resistive means and consumers; and means for indicating a change of said potentials due to an altered condition of at least one of said consumers.

* * * * *